United States Patent [19]

Goeke et al.

[11] 4,302,565
[45] Nov. 24, 1981

[54] IMPREGNATED POLYMERIZATION CATALYST, PROCESS FOR PREPARING, AND USE FOR ETHYLENE COPOLYMERIZATION

[75] Inventors: George L. Goeke, Belle Mead; Burkhard E. Wagner, Highland Park; Frederick J. Karol, Belle Mead, all of N.J.

[73] Assignee: Union Carbide Corporation, New York, N.Y.

[21] Appl. No.: 12,720

[22] Filed: Feb. 16, 1979

Related U.S. Application Data

[63] Continuation-in-part of Ser. No. 892,322, Mar. 31, 1978, abandoned.

[51] Int. Cl.$^3$ .................... C08F 2/34; C08F 4/02
[52] U.S. Cl. .................... 526/88; 252/429 B; 526/125; 526/348.6; 526/904
[58] Field of Search .................... 526/124, 125, 88

[56] References Cited

U.S. PATENT DOCUMENTS

| | | | |
|---|---|---|---|
| 3,152,088 | 10/1964 | Sandri et al. | 526/901 |
| 3,594,330 | 7/1971 | Delbouille et al. | 526/129 |
| 3,644,318 | 2/1972 | Diedrich et al. | 526/124 |
| 3,676,415 | 7/1972 | Diedrich et al. | 526/124 |
| 3,790,550 | 2/1974 | Miller | 526/901 |
| 4,086,408 | 7/1978 | Karol | 526/129 |
| 4,105,847 | 8/1978 | Ito et al. | 526/125 |

FOREIGN PATENT DOCUMENTS 1502567 3/1978 United Kingdom .

*Primary Examiner*—Edward J. Smith
*Attorney, Agent, or Firm*—John S. Piscitello

[57] ABSTRACT

A catalyst formed from selected organo aluminum compounds and a precursor composition of the formula $$Mg_mTi_1(OR)_nX_p[ED]_q$$

wherein ED is a selected electron donor compound
 m is $\geq 0.5$ to $\leq 56$
 n is 0, 1 or 2
 p is $\leq 2$ to $\geq 116$
 q is $\geq 2$ to $\leq 85$
 R is a $C_1$ to $C_{14}$ aliphatic or aromatic hydrocarbon radical, or COR' wherein R' is a $C_1$ to $C_{14}$ aliphatic or aromatic hydrocarbon radical, and
 X is selected from the group consisting of Cl, Br, I or mixtures thereof,
which catalyst is in particulate form and impregnated in a porous inert carrier material.

A process for preparing such catalyst.

A process for using said catalyst to readily prepare ethylene copolymers having a density of about $\geq 0.91$ to $\leq 0.94$ and a melt flow ratio of $\geq 22$ to $\leq 32$ in a low pressure gas phase process at a productivity of $\geq 50,000$ pounds of polymer per pound of Ti.

Novel polymers and molded articles are prepared.

6 Claims, 1 Drawing Figure

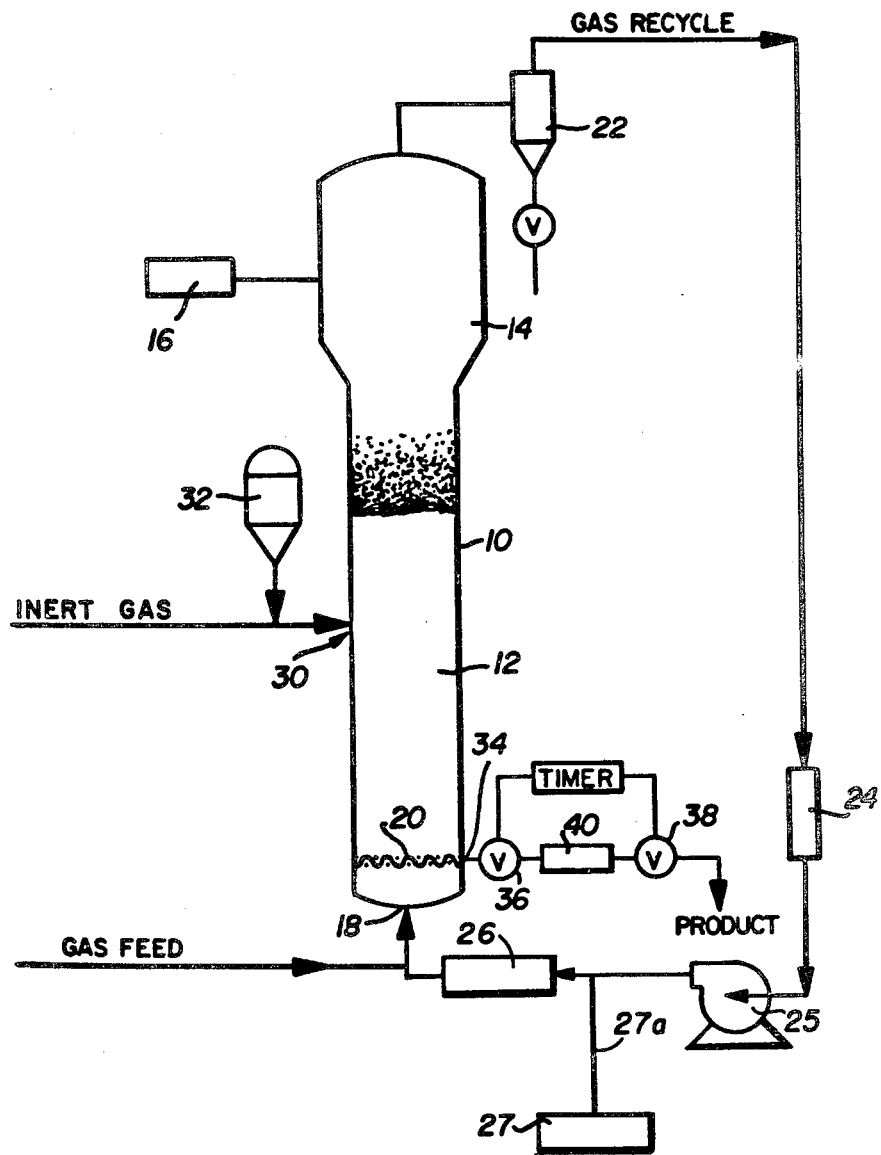

IMPREGNATED POLYMERIZATION CATALYST, PROCESS FOR PREPARING, AND USE FOR ETHYLENE COPOLYMERIZATION

This application is a Continuation-In-Part of copending application Ser. No. 892,322 filed Mar. 31, 1978, now abandoned.

BACKGROUND OF THE INVENTION

1. Field of the Invention

The invention relates to the catalytic copolymerization of ethylene with high activity Mg and Ti containing complex catalysts in a gas phase process to produce ethylene copolymers having a density of $\geq 0.91$ to $\leq 0.94$ and a melt flow ratio of $\geq 22$ to $\leq 32$.

2. Description of the Prior Art

Until recently, low density ($\leq 0.940$) polyethylene has been produced commercially, for the most part, by the high pressure ($\geq 15,000$ psi) homopolymerization of ethylene in the gas phase in stirred and elongated tubular reactors in the absence of solvents using free radical initiators. On a world wide basis, the amount of low density polyethylene produced in this fashion, annually, amounts to more than thirteen (13) billion pounds.

As recently disclosed in U.S. Pat. No. 4,011,382 and in Belgian Pat. No. 839,380 it has been found that low density polyethylene can be produced commercially at pressures of <1000 psi in a gas phase reaction in the absence of solvents by employing selected chromium and titanium (and, optionally, fluorine) containing catalysts under specific operating conditions in a fluid bed process.

The products produced by the processes of U.S. Pat. No. 4,011,382 and Belgian Pat. No. 839,380, however, have a relatively broad molecular weight distribution (Mw/Mn) of $\geq 6$ to $\leq 20$. As such, although readily useful for a large number of applications in the areas of wire and cable insulation and molded pipe they are not broadly useful in the areas of injection molding applications. They are also not broadly used in the area of film applications because of the poor optical and mechanical properties of films made from such resins.

To be commercially useful in a gas phase process, such as the fluid bed process of U.S. Pat. Nos. 3,709,853; 4,003,712 and 4,011,382 and Canadian Pat. No. 991,798 and Belgian Pat. No. 839,380, the catalyst employed must be a high activity catalyst, that is, it must have a level of productivity of $\geq 50,000$, and preferably $\geq 100,000$, pounds of polymer per pound of primary metal in the catalyst. This is so because such gas phase processes usually do not employ any catalyst residue removing procedures. Thus, the catalyst residue in the polymer must be so small that it can be left in the polymer without causing any undue problems in the hands of the resin fabricator and/or ultimate consumer. Where a high activity catalyst is successfully used in such fluid bed processes the heavy metal content of the resin is of the order of $\leq 20$ parts per million (ppm) of primary metal at a productivity level of $\geq 50,000$ and of the order of $\leq 10$ ppm at a productivity level of $\geq 100,000$ and of the order of $\leq 3$ ppm at a productivity level of $\geq 300,000$. Low catalyst residue contents are also important where the catalyst is made with chlorine containing materials such as the titanium, magnesium and/or aluminum chlorides used in some so-called Ziegler or Ziegler-Natta catalysts. High residual chlorine values in a molding resin will cause pitting and corrosion on the metal surfaces of the molding devices. Cl residues of the order of $\geq 200$ ppm are not commercially useful.

U.S. Pat. No. 3,989,881 discloses the use of a high activity catalyst for the manufacture, under slurry polymerization conditions, of ethylene polymers having a relatively narrow molecular weight distribution (Mw/Mn) of about 2.7 to 3.1. Attempts were made to use catalysts similar to those described in U.S. Pat. No. 3,989,881 for the purpose of making polyethylene of narrow molecular weight distribution by polymerizing ethylene alone or with propylene in the gas phase in a fluid bed process using apparatus and conditions similar to those employed in U.S. Pat. No. 4,011,382 and Belgian Pat. No. 839,380. These attempts were not successful. In order to avoid the use of the solvents in the slurried catalyst systems of U.S. Pat. No. 3,989,881 the Ti/Mg containing components were dried. However, the dried material, a viscous, gummy, pyrophoric composition, could not be readily fed to the reactor because it was not in a free flowing form. Even when blended with silica, to improve its free flowing properties and then added to the reactor, the results were commercially unacceptable. The productivity of the catalyst was poor, or the catalyst was pyrophoric and difficult to handle, or the polymer product had a low bulk density i.e., of the order of $\leq 6$ pounds/cubic foot.

Polymers of such low bulk density are not commercially desirable because they are fluffy. If the polymer is to be stored or sold in granular form, significantly larger amounts of storage and shipping space is required for handling these materials. Even if the granular polymer is to be pelletized prior to shipping, the processing of a given quantity of the low bulk density material through the pelletizing equipment requires significantly longer processing times than would the same quantity of high bulk density materials, when using the same extrusion equipment.

U.S. Pat. No. 4,124,532 discloses the polymerization of ethylene and propylene with high activity catalysts. These catalysts comprise complexes which may contain magnesium and titanium. These complexes are prepared by reacting the halide $MX_2$ (where M may be Mg) with a compound M'Y (where M' may be Ti and Y is halogen or an organic radical) in an electron donor compound. These complexes are then isolated by either crystallization, by evaporation of the solvent or by precipitation. Polymerization is carried out with these catalytic complexes and an alkyl aluminum compound.

However, U.S. Pat. No. 4,124,532 does not disclose any special techniques or methods of preparing the catalyst in order to achieve the desirable results described in the present invention. The use of the catalysts described in U.S. Pat. No. 4,124,532, without these special methods, would not lead to a commercial fluid bed process to produce polyethylenes at commercial rates. In addition the examples in the gas phase do not describe a practical process of copolymerization to produce the special low density copolymers with attractive polymer morphology described in the present invention.

U.S. Pat. Nos. 3,922,322 and 4,035,560 disclose the use of several Ti and Mg containing catalysts for the manufacture of granular ethylene polymers in a gas phase fluid bed process under a pressure of <1000 psi. The use of these catalysts in these processes, however, has significant disadvantages. The catalyst of U.S. Pat. No. 3,922,322 provides polymers having a very high catalyst residue content i.e., about 100 ppm of Ti and greater than about 300 ppm Cl, according to the working example of this patent. Further, as disclosed in the working example of U.S. Pat. No. 3,922,322, the catalyst is used in the form of a prepolymer, and very high volumes of the catalyst composition must be fed to the reactor. The preparation and use of this catalyst thus requires the use of relatively large sized equipment for the manufacture, storage and transporting of the catalyst.

The catalysts of U.S. Pat. No. 4,035,560 also apparently provide polymers having high catalyst residues, and the catalyst compositions are apparently pyrophoric because of the types and amounts of reducing agents employed in such catalysts.

U.S. patent application Ser. No. 892,325 filed Mar. 31, 1978, now abandoned, and refiled as Ser. No. 014,414 on Feb. 27, 1979, in the names of F. J. Karol et al and entitled Preparation of Ethylene Copolymers In Fluid Bed Reactor, and which corresponds to European Patent Application No. 79100953.3 which was published as Publication No. 004,645 on Oct. 17, 1979, discloses that ethylene copolymers, having a density of 0.91 to 0.96, a melt flow ratio of $\geq 22$ to $\leq 32$ and a relatively low residual catalyst content can be produced in granular form, at relatively high productivities if the monomer(s) are polymerized in a gas phase process with a specific high activity Mg-Ti containing complex catalyst which is blended with an inert carrier material. The granular polymers thus produced have excellent physical properties which allow them to be used in a broad range of molding applications. However these polymers have several disadvantages. First, because of the presence of the support material in the catalyst which is not removed from the polymer prior to the molding thereof, the polymer containing certain of these support materials is not too useful for clear film applications. These support particles may impart poor film rating values to clear films made from such polymers. Second, the polymers, particularly at the lower polymer densities, also have a relatively low bulk density. The handling of these polymers therefore requires the use of larger volumes of shipping and storing equipment than is required for the pelleted products which the molding industry is more accustomed to handling. As a result larger capital investments are needed for the equipment needed to handle and store these low bulk density granular materials. Further, the feeding of the low bulk density granular materials to molding and extrusion equipment requires longer feed times than is required for the same weight of pelleted material because of the larger volumes of the granular material that are involved. Third, the polymer particles formed during the fluid bed polymerization process are irregular in shape and are somewhat difficult to fluidize. The final product also contains a relatively high level of fines, i.e., particles having a particle size of $\leq 150$ microns.

SUMMARY OF THE INVENTION

It has now been unexpectedly found that ethylene copolymers having a wide density range of 0.91 to 0.94 and a melt flow ratio of $\geq 22$ to $\leq 32$ and which have a relatively low residual catalyst content and a relatively high bulk density and which provide films of good clarity can be produced at relatively high productivities for commercial purposes by a gas phase process if the ethylene is copolymerized with one or more $C_3$ to $C_8$ alpha olefins in the presence of a high activity magnesium-titanium complex catalyst prepared, as described below, under specific activation conditions with an organo aluminum compound and impregnated in a porous inert carrier material.

An object of the present invention is to provide a process for producing, with relatively high productivities and in a low pressure gas phase process, ethylene copolymers which have a density of about 0.91 to 0.94, a melt flow ratio of about 22 to 32, a relatively low residual catalyst content and a bulk density of about 19 to 31, and good film rating values in film form.

Another object of the present invention is to provide granular ethylene copolymers which have a particle shape which is round and more conductive to being fluidized in a fluid bed process and wherein the final polymer product contains a relatively low level of fines.

A further object of the present invention is to provide a process in which ethylene copolymers which are useful for a variety of end-use applications may be readily prepared.

A still further object of the present invention is to provide a variety of novel ethylene copolymers and molded articles made therefrom.

BRIEF DESCRIPTION OF THE DRAWINGS

The drawing shows a gas phase fluid bed reactor system in which the catalyst system of the present invention may be employed.

DESCRIPTION OF THE PREFERRED EMBODIMENT

It has now been found that the desired ethylene copolymers having a low melt flow ratio, a wide range of density values and relatively high bulk density values and good film properties can be readily produced with relatively high productivities in a low pressure gas phase fluid bed reaction process if the monomer charge is polymerized under a specific set of operating conditions, as detailed below, and in the presence of a specific high activity catalyst which is impregnated on an inert porous carrier material, as is also detailed below.

THE ETHYLENE COPOLYMERS

The copolymers which may be prepared in the process of the present invention are copolymers of a major mol percent ($\geq 90\%$) of ethylene, and a minor mol percent ($\leq 10\%$) of one (copolymer) or more (ter-, tetrapolymers) $C_3$ to $C_8$ alpha olefins which should not contain any branching on any of their carbon atoms which is closer than the fourth carbon atom. These alpha olefins include propylene, butene-1, pentene-1, hexene-1, 4-methyl pentene-1, heptene-1 and octene-1. The preferred alpha olefins are propylene, butene-1, hexene-1, 4-methyl pentene-1 and octene-1.

The copolymers have a melt flow ratio of $\geq 22$ to $\leq 32$, and preferably of $\geq 25$ to $\leq 30$. The melt flow ratio value is another means of indicating the molecular weight distribution of a polymer. The melt flow ratio (MFR) range of $\geq 22$ to $\leq 32$ thus corresponds to a Mw/Mn value range of about 2.7 to 4.1 and the MFR range of $\geq 25$ to $\leq 30$ corresponds to a Mw/Mn range of about 2.8 to 3.6.

The copolymers have a density of about $\geq 0.91$ to $\leq 0.94$ and preferably $\geq 0.917$ to $\leq 0.935$. The density of the copolymer, at a given melt index level for the copolymer, is primarily regulated by the amount of the $C_3$ to $C_8$ comonomer which is copolymerized with the ethylene. In the absence of the comonomer, the ethylene would homopolymerize with the catalyst of the present invention to provide homopolymers having a density of about $\geq 0.96$. Thus, the addition of progressively larger amounts of the comonomers to the copolymers results in a progressive lowering of the density of the copolymer. The amount of each of the various $C_3$ to $C_8$ comonomers needed to achieve the same result will vary from monomer to monomer, under the same reaction conditions.

Thus, to achieve the same results, in the copolymers, in terms of a given density, at a given melt index level, larger molar amounts of the different comonomers would be needed in the order of $C_3 > C_4 > C_5 > C_6 > C_7 > C_8$.

The melt index of a copolymer is a reflection of its molecular weight. Polymers having a relatively high molecular weight, have a relatively low melt index. Ultra-high molecular weight ethylene polymers have a high load (HLMI) melt index of about 0.0 and very high molecular weight ethylene polymers have a high load melt index (HLMI) of about 0.0 to about 1.0. Such high molecular weight polymers are difficult, if not impossible, to mold in conventional injection molding equipment. The polymers made in the process of the present invention, on the other hand, can be readily molded, in such equipment. They have a standard or normal load melt index of $\geq 0.0$ to about 100, and preferably of about 0.5 to 80, and a high load melt index (HLMI) of about 11 to about 2000. The melt index of the polymers which are made in the process of the present invention is a function of a combination of the polymerization temperature of the reaction, the density of the copolymer and the hydrogen/monomer ratio in the reaction system. Thus, the melt index is raised by increasing the polymerization temperature and/or by decreasing the density of the polymer and/or by increasing the hydrogen/monomer ratio. In addition to hydrogen, other chain transfer agents such as dialkyl zinc compounds may also be used to further increase the melt index of the copolymers.

The copolymers of the present invention have an unsaturated group content of $\leq 1$, and usually $\geq 0.1$ to $\leq 0.3$, $C=C/1000$ carbon atoms.

The copolymers of the present invention have a n-hexane extractables content (at 50° C.) of less than about 3, and preferably of less than about 2, weight percent.

The copolymers of the present invention have a residual catalyst content, in terms of parts per million of titanium metal, of the order of $>0$ to $\leq 20$ parts per million, (ppm) at a productivity level of $\geq 50,000$, and of the order of $>0$ to $\leq 10$ ppm at a productivity level of $\geq 100,000$ and of the order of $>0$ to $\leq 3$ parts per million at a productivity level of $\geq 300,000$. In terms of Cl, Br or I residues, the copolymers of the present invention have a Cl, Br or I residue content which depends upon the Cl, Br or I content of the precursor. From the Ti to Cl, Br or I ratio in the initial precursor, it is possible to calculate Cl, Br, or I residues from knowledge of the productivity level based on titanium residue only. For many of the copolymers of the present invention made only with Cl containing components of the catalyst system (Cl/Ti=7), one can calculate a Cl residue content of $>0$ to $\leq 140$ ppm at a productivity of $\geq 50,000$, a Cl content of $>0$ to $\leq 70$ ppm at a productivity of $\geq 100,000$, and a Cl content of $>0$ to $\leq 20$ ppm at a productivity of $\geq 300,000$. The copolymers are readily produced in the process of the present invention at productivities of up to about 500,000.

The copolymers of the present invention are granular materials which have an average particle size of the order of about 0.005 to about 0.07 inches, and preferably of about 0.02 to about 0.04 inches, in diameter. The particle size is important for the purposes of readily fluidizing the polymer particles in the fluid bed reactor, as described below. The copolymers of the present invention have a bulk density of about 19 to 31 pounds per cubic foot.

In addition to being useful for making film therefrom the copolymers of the present invention are useful in other molding applications.

For film making purposes the preferred copolymers of the present invention are those having a density of about $\geq 0.912$ to $\leq 0.940$, and preferably of about $\geq 0.916$ to $\leq 0.928$; a molecular weight distribution (Mw/Mn) of $\geq 2.7$ to $\leq 3.6$, and preferably of about $\geq 2.8$ to 3.1; and a standard melt index of $>0.5$ to $\leq 5.0$ and preferably of about $\geq 0.7$ to $\leq 4.0$. The films have a thickness of $>0$ to 10 mils and preferably of $>0$ to $\leq 5$ mils and more preferably of $>0$ to $\leq 1$ mil.

For the injection molding of flexible articles such as houseware materials, the preferred copolymers of the present invention are those having a density of $\geq 0.920$ to $\leq 0.940$ and preferably of about $\geq 0.925$ to $\leq 0.930$; a molecular weight distribution Mw/Mn of $\geq 2.7$ to $\leq 3.6$, and preferably of about $\geq 2.8$ to $\leq 3.1$; and a standard melt index of $\geq 2$ to $\leq 100$ and preferably of about $\geq 8$ to $\leq 80$.

HIGH ACTIVITY CATALYST

The compounds used to form the high activity catalyst used in the present invention comprise at least one titanium compound, at least one magnesium compound, at least one electron donor compound, at least one activator compound and at least one porous inert carrier material, as defined below.

The titanium compound has the structure

$Ti(OR)_a X_b$ wherein

R is a $C_1$ to $C_{14}$ aliphatic or aromatic hydrocarbon radical, or COR' where R' is a $C_1$ to $C_{14}$ aliphatic or aromatic hydrocarbon radical, X is selected from the group consisting of Cl, Br, I or mixtures thereof, a is 0, 1 or 2, b is 1 to 4 inclusive and a+b=3 or 4.

The titanium compounds can be used individually or in combinations thereof, and would include $TiCl_3$, $TiCl_4$, $Ti(OCH_3)Cl_3$, $Ti(OC_6H_5)Cl_3$, $Ti(OCOCH_3)Cl_3$ and $Ti(OCOC_6H_5)Cl_3$.

The magnesium compound has the structure

$MgX_2$ wherein X is selected from the group consisting of Cl, Br, I or mixtures thereof. Such magnesium compounds can be used individually or in combinations thereof and would include $MgCl_2$, $MgBr_2$ and $MgI_2$. Anhydrous $MgCl_2$ is the particularly preferred magnesium compound.

About 0.5 to 56, and preferably about 1 to 10, mols of the magnesium compound are used per mol of the titanium compound in preparing the catalysts employed in the present invention.

The titanium compound and the magnesium compound should be used in a form which will facilitate their dissolution in the electron donor compound, as described herein below.

The electron donor compound is an organic compound which is liquid at 25° C. and in which the titanium compound and the magnesium compound are soluble. The electron donor compounds are known, as such, or as Lewis bases.

The electron donor compounds would include such compounds as alkyl esters of aliphatic and aromatic carboxylic acids, aliphatic ethers, cyclic ethers and aliphatic ketones. Among these electron donor compounds the preferable ones are alkyl esters of $C_1$ to $C_4$ saturated aliphatic carboxylic acids; alkyl esters of $C_7$ to $C_8$ aromatic carboxylic acids; $C_2$ to $C_8$, and preferably $C_3$ to $C_4$, aliphatic ethers; $C_3$ to $C_4$ cyclic ethers, and preferably $C_4$ cyclic mono- or di-ether; $C_3$ to $C_6$, and preferably $C_3$ to $C_4$, aliphatic ketones. The most preferred of these electron donor compounds would include methyl formate, ethyl acetate, butyl acetate, ethyl ether, hexyl ether, tetrahydrofuran, dioxane, acetone and methyl isobutyl ketone.

The electron donor compounds can be used individually or in combinations thereof.

About 2 to 85, and preferably about 3 to 10 mols of the electron donor compound are used per mol of Ti.

The activator compound has the structure $$Al(R'')_c X'_d H_e$$

wherein $X'$ is Cl or $OR'''$, $R''$ and $R'''$ are the same or different and are $C_1$ to $C_{14}$ saturated hydrocarbon radicals, d is 0 to 1.5, e is 1 or 0 and $c+d+e=3$.

Such activator compounds can be used individually or in combinations thereof and would include $Al(C_2H_5)_3$, $Al(C_2H_5)_2Cl$, $Al(i-C_4H_9)_3$, $Al_2(C_2H_5)_3Cl_3$, $Al(i-C_4H_9)_2H$, $Al(C_6H_{13})_3$, $Al(C_8H_{17})_3$, $Al(C_2H_5)_2H$ and $Al(C_2H_5)_2(OC_2H_5)$.

About 10 to 400, and preferably about 10 to 100, mols of the activator compound are used per mol of the titanium compound in activating the catalysts employed in the present invention.

The carrier materials are solid, particulate porous materials which are inert to the other components of the catalyst composition, and to the other active components of the reaction system. These carrier materials would include inorganic materials such as oxides of silicon and/or aluminum. The carrier materials are used in the form of dry powders having an average particle size of about 10 to 250, and preferably of about 50 to 150 microns. These materials are also porous and have a surface area of $\geq 3$, and preferably of $\geq 50$, square meters per gram. Catalyst activity or productivity is apparently also improved with silica having pore sizes of $\geq 80$ Angstrom units and preferably of $\geq 100$ Angstrom units. The carrier material should be dry, that is, free of absorbed water. Drying of the carrier material is carried out by heating it at a temperature of $\geq 600°$ C. Alternatively, the carrier material dried at a temperature of $\geq 200°$ C. may be treated with about 1 to 8 weight percent of one or more of the aluminum alkyl compounds described above. This modification of the support by the aluminum alkyl compounds provides the catalyst composition with increased activity and also improves polymer particle morphology of the resulting ethylene polymers.

CATALYST PREPARATION: FORMATION OF PRECURSOR

The catalyst used in the present invention is prepared by first preparing a precursor composition from the titanium compound, the magnesium compound, and the electron donor compound, as described below, and then impregnating the carrier material with the precursor composition and then treating the impregnated precursor composition with the activator compound in one or more steps as described below.

The precursor composition is formed by dissolving the titanium compound and the magnesium compound in the electron donor compound at a temperature of about 20° C. up to the boiling point of the electron donor compound. The titanium compound can be added to the electron donor compound before or after the addition of the magnesium compound, of concurrent therewith. The dissolution of the titanium compound and the magnesium compound can be facilitated by stirring, and in some instances by refluxing these two compounds in the electron donor compound. After the titanium compound and the magnesium compound are dissolved, the precursor composition may be isolated by crystallization or by precipitation with a $C_5$ to $C_8$ aliphatic or aromatic hydrocarbon such as hexane, isopentane or benzene.

The crystallized or precipitated precursor composition may be isolated, in the form of fine, free flowing particles having an average particle size of about 10 to 100 microns and a bulk density of about 18 to 33 pounds per cubic foot.

When thus made as disclosed above the precursor composition has the formula $$Mg_m Ti_1(OR)_n X_p[ED]_q$$

wherein
ED is the electron donor compound,
m is $\geq 0.5$ to $\leq 56$, and preferably $\geq 1.5$ to $\leq 5$,
n is 0, 1 or 2
p is $\geq 2$ to $\leq 116$, and preferably $\geq 6$ to $\leq 14$,
q is $\geq 2$ to $\leq 85$, and preferably $\geq 4$ to $\leq 11$,
R is a $C_1$ to $C_{14}$ aliphatic or aromatic hydrocarbon radical, or $COR'$ wherein $R'$ is a $C_1$ to $C_{14}$ aliphatic or aromatic hydrocarbon radical and,
X is selected from the group consisting of Cl, Br, I or mixtures thereof.

The subscript for the element titanium (Ti) is the arabic numeral one.

CATALYST PREPARATION: IMPREGNATION OF PRECURSOR IN SUPPORT

The precursor composition is then impregnated, in a weight ratio of about 0.033 to 1, and preferably about 0.1 to 0.33, parts of the precursor composition into one part by weight of the carrier material.

The impregnation of the dried (activated) support with the precursor composition may be accomplished by dissolving the precursor composition in the electron donor compound, and by then admixing the support with the dissolved precursor composition so as to allow the precursor composition to impregnate the support. The solvent is then removed by drying at temperatures of $\leq 70°$ C.

The support may also be impregnated with the precursor composition by adding the support to a solution of the chemical raw materials used to form the precursor composition in the electron donor compound, without isolating the precursor composition from such solution. The excess electron donor compound is then removed by drying or washing and drying at temperatures of $\leq 70°$ C.

ACTIVATION OF PRECURSOR COMPOSITION

In order to be used in the process of the present invention the precursor composition must be fully or completely activated, that is, it must be treated with sufficient activator compound to transform the Ti atoms in the precursor composition to an active state.

It has been found that, in order to prepare a useful catalyst it is necessary to conduct the activation in such a way that, at least the final activation stage must be conducted in the absence of solvent so as to avoid the need for drying the fully active catalyst to remove solvent therefrom. Two procedures have been developed to accomplish this result.

In one procedure, the precursor composition is completely activated, outside the reactor, in the absence of solvent, by dry blending the impregnated precursor composition with the activator compound. In this dry blending procedure the activator compound is used while impregnated in a carrier material. In this procedure the fully activated precursor composition is prepared without having to heat the composition above 50° C. prior to feeding it to the polymerization reactor.

In the second, and preferred of such catalyst activation procedures, the precursor composition is partially activated outside the polymerization reactor with enough activator compound so as to provide a partially activated precursor composition which has an activator compound/Ti molar ratio of about $>0$ to $<10:1$ and preferably of about 4 to 8:1. This partial activation reaction is preferably carried out in a hydrocarbon solvent slurry followed by drying of the resulting mixture, to remove the solvent, at temperatures between 20 to 80, and preferably of 50° to 70° C. The resulting product is a free-flowing solid particulate material which can be readily fed to the polymerization reactor. The partially activated and impregnated precursor composition is fed to the polymerization reactor where the activation is completed with additional activator compound which can be the same or a different compound.

The additional activator compound and the partially activated impregnated precursor composition are preferably fed to the reactor through separate feed lines. The additional activator compound may be sprayed into the reactor in the form of a solution thereof in a hydrocarbon solvent such as isopentane, hexane, or mineral oil. This solution usually contains about 2 to 30 weight percent of the activator compound. The additional activator compound is added to the reactor in such amounts as to provide, in the reactor, with the amounts of activator compound and titanium compound fed with the partially activated and impregnated precursor composition, a total Al/Ti molar ratio of $\geq 10$ to 400 and preferably of about 15 to 60. The additional amounts of activator compound added to the reactor, react with, and complete the activation of, the titanium compound in the reactor.

In a continuous gas phase process, such as the fluid bed process disclosed below, discrete portions of the partially or completely activated precursor composition impregnated on the support are continuously fed to the reactor, with discrete portions of any additional activator compound needed to complete the activation of the partially activated precursor composition, during the continuing polymerization process in order to replace active catalyst sites that are expended during the course of the reaction.

THE POLYMERIZATION REACTION

The polymerization reaction is conducted by contacting a stream of the monomers, in a gas phase process, such as in the fluid bed process described below, and substantially in the absence of catalyst poisons such as moisture, oxygen, carbon monoxide, carbon dioxide and acetylene with a catalytically effective amount of the completely activated precursor composition (the catalyst) impregnated on a support at a temperature and at a pressure sufficient to initiate the polymerization reaction.

In order to achieve the desired density ranges in the copolymers it is necessary to copolymerize enough of the $\geq C_3$ comonomers with ethylene to achieve a level of $\geq 1$ to 10 mol percent of the $C_3$ to $C_8$ comonomer in the copolymer. The amount of comonomer needed to achieve this result will depend on the particular comonomer(s) employed.

There is provided below a listing of the amounts, in mols, of various comonomers that must be copolymerized with ethylene in order to provide polymers having the desired density range at any given melt index. The listing also indicates the relative molar concentration, of such comonomer to ethylene, which must be present in the gas stream of monomers which is fed to the reactor.

| Comonomer | mol % needed in copolymer | Gas Stream Comonomer/Ethylene molar ratio |
|---|---|---|
| propylene | 3.0 to 10 | 0.2 to 0.9 |
| butene-1 | 2.5 to 7.0 | 0.2 to 0.7 |
| pentene-1 | 2.0 to 6.0 | 0.15 to 0.45 |
| hexene-1 | 1.0 to 5.0 | 0.12 to 0.4 |
| octene-1 | 0.8 to 4.5 | 0.10 to 0.35 |

A fluidized bed reaction system which can be used in the practice of the process of the present invention is illustrated in FIG. 1. With reference thereto the reactor 10 consists of a reaction zone 12 and a velocity reduction zone 14.

The reaction zone 12 comprises a bed of growing polymer particles, formed polymer particles and a minor amount of catalyst particles fluidized by the continuous flow of polymerizable and modifying gaseous components in the form of make-up feed and recycle gas through the reaction zone. To maintain a viable fluidized bed, the mass gas flow rate through the bed must be above the minimum flow required for fluidization, and preferably from about 1.5 to about 10 times $G_{mf}$ and more preferably from about 3 to about 6 times $G_{mf}$. $G_{mf}$ is used in the accepted form as the abbreviation for the minimum mass gas flow required to achieve fluidization, C. Y. Wen and Y. H. Yu, "Mechanics of Fluidization," Chemical Engineering Progress Symposium Series, Vol. 62, p. 100–111 (1966).

It is essential that the bed always contains particles to prevent the formation of localized "hot spots" and to entrap and distribute the particulate catalyst throughout the reaction zone. On start up, the reaction zone is usually charged with a base of particulate polymer particles before gas flow is initiated. Such particles may be identical in nature to the polymer to be formed or different therefrom. When different, they are withdrawn with the desired formed polymer particles as the first product. Eventually, a fluidized bed of the desired polymer particles supplants the start-up bed.

The partially or completely activated precursor compound (the catalyst) used in the fluidized bed is preferably stored for service in a reservoir 32 under a blanket of a gas which is inert to the stored material, such as nitrogen or argon.

Fluidization is achieved by a high rate of gas recycle to and through the bed, typically in the order of about 50 times the rate of feed of make-up gas. The fluidized bed has the general appearance of a dense mass of viable particles in possible free-vortex flow as created by the percolation of gas through the bed. The pressure drop through the bed is equal to or slightly greater than the mass of the bed divided by the cross-sectional area. It is thus dependent on the geometry of the reactor.

Make-up gas is fed to the bed at a rate equal to the rate at which particulate polymer product is withdrawn. The composition of the make-up gas is determined by a gas analyzer 16 positioned above the bed. The gas analyzer determines the composition of the gas being recycled and the composition of the make-up gas is adjusted accordingly to maintain an essentially steady state gaseous composition within the reaction zone.

To insure complete fluidization, the recycle gas and, where desired, part of the make-up gas are returned to the reactor at point 18 below the bed. There exists a gas distribution plate 20 above the point of return to aid fluidizing the bed.

The portion of the gas stream which does not react in the bed constitutes the recycle gas which is removed from the polymerization zone, preferably by passing it into a velocity reduction zone 14 above the bed where entrained particles are given an opportunity to drop back into the bed. Particle return may be aided by a cyclone 22 which may be part of the velocity reduction zone or exterior thereto. Where desired, the recycle gas may then be passed through a filter 24 designed to remove small particles at high gas flow rates to prevent dust from contacting heat transfer surfaces and compressor blades.

The recycle gas is then compressed in a compressor 25 and then passed through a heat exchanger 26 wherein it is stripped of heat of reaction before it is returned to the bed. By constantly removing heat of reaction, no noticeable temperature gradient appears to exist within the upper portion of the bed. A temperature gradient will exist in the bottom of the bed in a layer of about 6 to 12 inches, between the temperature of the inlet gas and the temperature of the remainder of the bed. Thus, it has been observed that the bed acts to almost immediately adjust the temperature of the recycle gas above this bottom layer of the bed zone to make it conform to the temperature of the remainder of the bed thereby maintaining itself at an essentially constant temperature under steady conditions. The recycle is then returned to the reactor at its base 18 and to the fluidized bed through distribution plate 20. The compressor 25 can also be placed upstream of the heat exchanger 26.

The distribution plate 20 plays an important role in the operation of the reactor. The fluidized bed contains growing and formed particulate polymer particles as well as catalyst particles. As the polymer particles are hot and possibly active, they must be prevented from settling, for if a quiescent mass is allowed to exist, any active catalyst contained therein may continue to react and cause fusion. Diffusing recycle gas through the bed at a rate sufficient to maintain fluidization at the base of the bed is, therefore, important. The distribution plate 20 serves this purpose and may be a screen, slotted plate, perforated plate, a plate of the bubble cap type and the like. The elements of the plate may all be stationary, or the plate may be of the mobile type disclosed in U.S. Pat. No. 3,298,792. Whatever its design, it must diffuse the recycle gas through the particles at the base of the bed to keep them in a fluidized condition, and also serve to support a quiescent bed of resin particles when the reactor is not in operation. The mobile elements of the plate may be used to dislodge any polymer particles entrapped in or on the plate.

Hydrogen may be used as a chain transfer agent in the polymerization reaction of the present invention. The ratio of hydrogen/ethylene employed will vary between about 0 to about 2.0 moles of hydrogen per mole of the monomer in the gas stream.

Any gas inert to the catalyst and reactants can also be present in the gas stream. The activator compound is preferably added to the gas recycle system at the hottest portion thereof. Addition into the recycle line, therefore, downstream from the heat exchanger is preferred, as from dispenser 27 thru line 27A.

Compounds of the structure $Zn(R_a)(R_b)$, wherein $R_a$ and $R_b$ are the same or different $C_1$ to $C_{14}$ aliphatic or aromatic hydrocarbon radicals, may be used in conjunction with hydrogen, with the catalysts of the present invention as molecular weight control or chain transfer agents, that is, to increase the melt index values of the copolymers that are produced. About 0 to 50, and preferably about 20 to 30, moles of the Zn compound (as Zn) would be used in the gas stream in the reactor per mol of titanium compound (as Ti) in the reactor. The zinc compound would be introduced into the reactor preferably in the form of a dilute solution (2 to 10 weight percent) in a hydrocarbon solvent or absorbed on a solid diluent material, such as silica, in amounts of about 10 to 50 weight percent. These compositions tend to be pyrophoric. The zinc compound may be added into the recycle gas stream from a feeder adjacent to feeder 27.

It is essential to operate the fluid bed reactor at a temperature below the sintering temperature of the polymer particles. To insure that sintering will not occur, operating temperatures below the sintering temperature are desired. For the production of ethylene copolymers in the process of the present invention an operating temperature of about 30° to 105° C. is preferred and a temperature of about 75° to 95° C. is most preferred. Temperatures of about 75° to 90° C. are used to prepare products having a density of about 0.91 to 0.92, and temperatures of about 80° to 100° C. are used to prepare products having a density of about >0.92 to 0.94.

The fluid bed reactor is operated at pressures of up to about 1000 psi, and is preferably operated at a pressure of from about 150 to 350 psi, with operation at the higher pressures in such ranges favoring heat transfer since an increase in pressure increases the unit volume heat capacity of the gas.

The partially or completely activated precursor composition is injected into the bed at a rate equal to its consumption at a point 30 which is above the distribution plate 20. Injecting the catalyst at a point above the distribution plate is an important feature of this invention. Since the catalysts used in the practice of the invention are highly active, injection of the fully activated catalyst into the area below the distribution plate may cause polymerization to begin there and eventually cause plugging of the distribution plate. Injection into the viable bed, instead, aids in distributing the catalyst throughout the bed and tends to preclude the formation of localized spots of high catalyst concentration which may result in the formation of "hot spots".

A gas which is inert to the catalyst such as nitrogen or argon is used to carry the partially or completely reduced precursor composition, and any additional activator compound or non-gaseous chain transfer agent that is needed, into the bed.

The production rate of the bed is controlled by the rate of catalyst injection. The productivity of the bed may be increased by simply increasing the rate of catalyst injection and decreased by reducing the rate of catalyst injection.

Since any change in the rate of catalyst injection will change the rate of generation of the heat of reaction, the temperature of the recycle gas is adjusted upwards or downwards to accomodate the change in rate of heat generation. This insures the maintenance of an essentially constant temperature in the bed. Complete instrumentation of both the fluidized bed and the recycle gas cooling system, is, of course, necessary to detect any temperature change in the bed so as to enable the operator to make a suitable adjustment in the temperature of the recycle gas.

Under a given set of operating conditions, the fluidized bed is maintained at essentially a constant height by withdrawing a portion of the bed as product at a rate equal to the rate of formation of the particulate polymer product. Since the rate of heat generation is directly related to product formation, a measurement of the temperature rise of the gas across the reactor (the difference between inlet gas temperature and exist gas temperature) is determinative of the rate of particulate polymer formation at a constant gas velocity.

The particulate polymer product is preferably continuously withdrawn at a point 34 at or close to the distribution plate 20 and in suspension with a portion of the gas stream which is vented before the particles settle to preclude further polymerization and sintering when the particles reach their ultimate collection zone. The suspending gas may also be used, as mentioned above, to drive the product of one reactor to another reactor.

The particulate polymer product is conveniently and preferably withdrawn through the sequential operation of a pair of timed valves 36 and 38 defining a segregation zone 40. While valve 38 is closed, valve 36 is opened to emit a plug of gas and product to the zone 40 between it and valve 36 which is then closed. Valve 38 is then opened to deliver the product to an external recovery zone. Valve 38 is then closed to await the next product recovery operation.

Finally, the fluidized bed reactor is equipped with an adequate venting system to allow venting the bed during start up and shut down. The reactor does not require the use of stirring means and/or wall scraping means.

The highly active supported catalyst system of this invention appears to yield a fluid bed product having an average particle size between about 0.01 to about 0.07 inches and preferably about 0.02 to about 0.04 inches wherein catalyst residue is unusually low. The polymer particles are relatively easy to fluidize in a fluid bed process. The polymer product contains a relatively low level of fines ($\leq 150$ microns) i.e., $\leq 4\%$ by weight.

The feed stream of gaseous monomer, with or without inert gaseous diluents, is fed into the reactor at a space time yield of about 2 to 10 pounds/hour/cubic foot of bed volume.

The term virgin resin or polymer as used herein means polymer, in granular form, as it is recovered from the polymerization reactor.

The following Examples are designed to illustrate the process of the present invention and are not intended as a limitation upon the scope thereof.

The properties of the polymers produced in the Examples were determined by the following test methods:

| | |
|---|---|
| Density | A plaque is made and conditioned for one hour at 100° C. to approach equilibrium crystallinity. Measurement for density is then made in a density gradient column. |
| Melt Index (MI) | ASTM D-2338 - Condition E - Measured at 190° C. - reported as grams per 10 minutes. |
| Flow Rate (HLMI) | ASTM D-1238 - Condition F - Measured at 10 times the weight used in the melt index test above. |
| Melt Flow Ratio (MFR) | $= \frac{\text{Flow Rate}}{\text{Melt Index}}$ |
| productivity | a sample of the resin product is ashed, and the weight % of ash is determined; since the ash is essentially composed of the catalyst, the productivity is thus the pounds of polymer produced per pound of total catalyst consumed. The amount of Ti, Mg and Cl in the ash are determined by elementals analysis. |
| Bulk Density | The resin is poured via $\frac{3}{8}''$ diameter funnel into a 100 mil graduated cylinder to 100 mil line without shaking the cylinder, and weighed by difference. |
| Molecular Weight Distribution (Mw/Mn) | Gel Permeation Chromatography Styrogel Packing: (Pore Size Sequence is $10^7$, $10^5$, $10^4$, $10^3$, 60 A°) Solvent is Perchloroethylene at 117° C. Detection: Infrared at 3.45 $\mu$. |
| Film Rating: | A sample of film is viewed with the naked eye to note the size and distribution of gels or other foreign particles in comparison to standard film samples. The appearance of the film as thus compared to the standard samples is then given a rating on a scale of $-100$ (very poor) to $+100$ (excellent). |
| n-hexane extractables | (FDA test used for polyethylene film intended for food contact applications). A 200 square inch sample of 1.5 mil gauge film is cut into strips measuring $1'' \times 6''$ and weighed to the nearest 0.1 mg. The strips are placed in a vessel and extracted with 300 ml of n-hexane at 50 $\pm$ 1° C. for 2 hours. The extract is then decanted into tared culture dishes. After drying the extract in a vacuum |

| | -continued |
|---|---|
| | desiccator the culture dish is weighed to the nearest 0.1 mg. The extractables, normalized with respect to the original sample weight, is then reported as the weight fraction of n-hexane extractables. |
| Unsaturation | Infrared Spectrophotometer (Perkin Elmer Model 21). Pressings made from the resin which are 25 mils in thickness are used as test specimens. Absorbance is measured at 10.35$\mu$ for transvinylidene unsaturation, 11.0$\mu$ for terminal vinyl unsaturation. and 11.25$\mu$ for pendant vinylidene unsaturation. The absorbance per mil of thickness of the pressing is directly proportional to the product of unsaturation concentration and absorbtivity. Absorbtivities are taken from the literature values of R. J. de Kock, et al, J. Polymer Science, Part B, 2, 339 (1964). |

1a.

PREPARATION OF IMPREGNATED PRECURSOR

In a 12 l flask equipped with a mechanical stirrer are placed 41.8 g (0.439 mol) anhydrous MgCl$_2$ and 2.5 l tetrahydrofuran (THF). To this mixture, 27.7 g (0.184 mol) TiCl$_4$ is added dropwise over $\frac{1}{2}$ hour. It may be necessary to heat the mixture to 60° C. for about $\frac{1}{2}$ hour in order to completely dissolve the material.

The precursor composition can be isolated from solution by crystallization or precipitation. It may be analyzed at this point for Mg and Ti content since some of the Mg and/or Ti compound may have been lost during the isolation of the precursor composition. The empirical formulas used herein in reporting the precursor compositions are derived by assuming that the Mg and the Ti still exist in the form of the compounds in which they were first added to the electron donor compound. The amount of electron donor is determined by chromatography.

500 g of porous silica dehydrated to 800° C. and optionally treated with 4 to 8 wt. % triethyl aluminum is added to the above solution and stirred for $\frac{1}{4}$ hour. The mixture is dried with a N$_2$ purge at 60° C. for about 3–5 hours to provide a dry free flowing powder having the particle size of the silica. The absorbed precursor composition has the formula

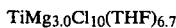

TiMg$_{3.0}$Cl$_{10}$(THF)$_{6.7}$

1b.

PREPARATION OF IMPREGNATED PRECURSOR FROM PREFORMED PRECURSOR COMPOSITION

In a 12 liter flask equipped with a mechanical stirrer, 146 g of precursor composition is dissolved in 2.5 liters dry THF. The solution may be heated to 60° C. in order to facilitate dissolution. 500 g of porous silica is added and the mixture is stirred for $\frac{1}{4}$ hour. The mixture is dried with a N$_2$ purge at $\leq$60° C. for about 3–5 hours to provide a dry free flowing powder having the particle size of the silica.

II. ACTIVATION PROCEDURE

The desired weights of impregnated precursor composition and activator compound are added to a mixing tank with sufficient amounts of anhydrous aliphatic hydrocarbon diluent such as isopentane to provide a slurry system.

The activator compound and precursor compound are used in such amounts as to provide a partially activated precursor composition which has an Al/Ti ratio of $>0$ to $\leq 10:1$ and preferably of 4 to 8:1.

The contents of the slurry system are then thoroughly mixed at room temperature and at atmospheric pressure for about $\frac{1}{4}$ to $\frac{1}{2}$ hour. The resulting slurry is then dried under a purge of dry inert gas such as nitrogen or argon, at atmospheric pressure and at a temperature of 65°$\pm$10° C. to remove the hydrocarbon diluent. This process usually requires about 3 to 5 hours. The resulting catalyst is in the form of a partially activated precursor composition which is impregnated within the pores of the silica. The material is a free flowing particulate material having the size and shape of the silica. It is not pyrophoric unless the aluminum alkyl content exceeds a loading of 10 weight percent. It is stored under a dry inert gas such as nitrogen or argon prior to future use. It is now ready for use and injected into, and fully activated within, the polymerization reactor.

When additional activator compound is fed to the polymerization reactor for the purpose of completing the activation of the precursor composition, it is fed into the reactor as a dilute solution in a hydrocarbon solvent such as isopentane. These dilute solutions contain about 5 to 30% by volume of the activator compound.

The activator compound is added to the polymerization reactor so as to maintain the Al/Ti ratio in the reactor at a level of about $\geq 10$ to 400:1 and preferably of 15 to 60:1.

EXAMPLES 1 TO 6

Ethylene was copolymerized with butene-1 in each of this series of 6 examples.

In Examples 1 to 3 the catalyst used was formed as described above. The silica impregnated catalyst system of Examples 1 and 2 contained 14.5 weight % of precursor composition, and the silica impregnated catalyst system of Example 3 contained 20.0 weight % of precursor composition. The silica support used for the catalyst of Example 2 was treated with triethyl aluminum, before it was used to make the supported catalyst system.

The catalysts used in Examples 4 to 6 were prepared by methods outside the scope of the catalysts of the present invention for comparative purposes. The catalyst of Example 4 was prepared by physically blending 7.5 weight % of the unimpregnated precursor composition of preparation Ia with 92.5 weight % of polyethylene powder. The polyethylene powder is high pressure, low density, ($<0.94$) ethylene homopolymer which has an average particle size of about 50 to 150 microns. The catalyst of Examples 5 and 6 was prepared by physically blending 20 weight % of the unimpregnated precursor composition of preparation Ia with 80 weight % of silica having a surface area of 300 m$^2$/gram and an average particle size of 70$\mu$. In each of Examples 1 to 6 the precursor composition was partially activated with triethyl aluminum so as to provide the silica/precursor composition with an Al/Ti mol ratio of 5+1. The completion of the activation of the precursor composition in the polymerization reactor was accomplished with a 5% by weight solution of triethyl aluminum in isopentane so as to provide the completely activated catalyst in the reactor with an Al/Ti mol ratio of 25 to 30.

Each of the reactions was conducted for 1 hour, after equilibrium was reached, at 85° C. and under a pressure of 300 psig, a gas velocity of about 3 to 6 times Gmf and a space time yield of about 4.4 to 6.3 in a fluid bed reactor system. The reaction system was as described in the drawing above. It has a lower section 10 feet high and 13½ inches in (inner) diameter, and an upper section which was 16 feet high and 23½ inches in (inner) diameter.

Table I below lists the butene-1/ethylene molar ratio and H₂/ethylene molar ratio and the space time yield (lbs/hr/ft³ of bed space) used in each example, as well as the various properties of the polymers made in such examples, and various properties of film samples made from some of such polymers.

As compared to granular copolymers made in copending application Ser. No. 014,414 filed on Feb. 27, 1979 in the names of F. J. Karol et al and entitled "Preparation of Ethylene Copolymers in Fluid Bed Reactor" the copolymers of the present invention, in virgin powder form, and at a given density and melt index, have a smaller average particle size, a narrower particle size distribution, are easier to fluidize, have higher bulk densities and are easier to convey pneumatically. In film form, the copolymers made by the process of the present invention have significantly better film properties than the copolymers made in said copending application.

TABLE I

| Example | 2 | 1 | 3 | 4 | 5 | 6 |
|---|---|---|---|---|---|---|
| Operating Conditions | | | | | | |
| $C_4/C_2$ mol ratio | 0.448 | 0.472 | 0.402 | 0.462 | 0.423 | 0.401 |
| $H_2/C_2$ mol ratio | 0.193 | 0.215 | 0.535 | 0.204 | 0.207 | 0.394 |
| Space time yield (lbs/hr/ft³ bed space) | 5.4 | 6.3 | 5.2 | 4.4 | 5.3 | — |
| Polymer Properties | | | | | | |
| Melt index | 1.8 | 2.2 | 17.8 | 2.3 | 1.3 | 15.7 |
| Melt flow ratio | 25.3 | 25.1 | 23.7 | 25.5 | 25.3 | 25.0 |
| Density | 0.9238 | 0.9208 | 0.9278 | 0.924 | 0.923 | 0.928 |
| Ti, ppm | 5–6 | 5–6 | 7–9 | 2–3 | 2–3 | 1 |
| % ash | 0.042 | 0.049 | 0.059 | — | 0.034 | 0.034 |
| Film Properties | | | | | | |
| Gloss (%) | 159 | 141 | — | — | — | — |
| Haze (%) | 9.7 | 13.6 | — | — | — | — |
| Hexane extractables (%) | 0.17 | 0.41 | — | — | — | — |
| Film rating | +30 | +25 | — | +40 | −60 | — |
| Granular Properties | | | | | | |
| Bulk density | 20.9 | 19.3 | 24.9 | 14.5 | 16.0 | 16.72 |
| $U_{mf}$ (ft/sec) | 0.47 | 0.65 | 0.28 | 1.3 | 0.72 | — |
| $U_{mx}$ (ft/sec) | 0.85 | 1.2 | 0.7 | 2.1 | 1.1 | — |
| Screen Analysis (weight %) | | | | | | |
| screen size - 8 mesh | 1.4 | 1.8 | 0.0 | 7.7 | 17.4 | 1.3 |
| screen size - 12 mesh | 4.4 | 8.7 | 0.4 | 28.5 | 14.4 | 2.5 |
| screen size - 20 mesh | 27.7 | 38.7 | 13.4 | 42.9 | 28.4 | 11.4 |
| screen size - 40 mesh | 40.2 | 37.1 | 47.9 | 15.9 | 19.0 | 41.9 |
| screen size - 60 mesh | 16.7 | 11.0 | 25.3 | 4.0 | 9.1 | 25.4 |
| screen size - 100 mesh | 7.0 | 2.2 | 9.4 | 0.6 | 8.1 | 14.7 |
| pan | 2.6 | 0.6 | 3.6 | 0.2 | 3.4 | 2.8 |
| Average particle size, inch | 0.0324 | 0.0375 | 0.022 | 0.0586 | 0.0542 | 0.023 |

EXAMPLES 7 TO 10

Ethylene was copolymerized with butene-1 in each of these series of examples.

In these examples the silica impregnated catalyst precursor was formed as described above. The silica impregnated catalyst system contained 20.0 weight % of precursor composition. The silica support used for the catalysts of these examples was treated with triethyl aluminum, before it was used to make the supported catalyst system. In each of these examples the precursor composition was partially activated with the aluminum compound shown in Table II, according to the procedure as described above, so as to provide the impregnated precursor with an Al/Ti mol ratio as shown in Table II. The completion of the activation of the precursor composition in the polymerization reactor was accomplished with a 5% by weight solution of triethyl aluminum in isopentane so as to provide the completely activated catalyst in the reactor with an Al/Ti mol ratio of 25 to 30.

Each of the polymerization reactions was conducted as described in Examples 1 to 6.

Table II below lists the activator compound and Al/Ti mole ratio in preparing the precursor composition. The butene-1/ethylene molar ratio and H₂/ethylene molar ratio and the space time yield (lbs/hr/ft³ of bed space) used in each example, as well as the various properties of the polymers made in such examples.

TABLE II

| Example | 2 | 7 | 8 | 9 | 10 |
|---|---|---|---|---|---|
| Precursor Activation | | | | | |
| Activator compound[1] | TEAL | TIBAL | TIBAL | TNHEXAL | TNOCTAL |
| Al/Ti mol ratio | 4.5 | 6.7 | 4.5 | 6.6 | 7.5 |
| Operating Conditions | | | | | |

TABLE II-continued

| Example | 2 | 7 | 8 | 9 | 10 |
|---|---|---|---|---|---|
| $C_4/C_2$ mol ratio | 0.448 | 0.375 | 0.369 | 0.375 | 0.368 |
| $H_2/C_2$ mol ratio | 0.193 | 0.266 | 0.247 | 0.266 | 0.249 |
| Space time yield (lbs/hr/ft³ bed space) | 5.4 | 5.8 | 5.0 | 5.3 | 7.8 |
| Polymer Properties | | | | | |
| Melt index | 1.8 | 2.8 | 1.1 | 2.9 | 2.2 |
| Melt flow ratio | 25.3 | 29.9 | 25.5 | 28.4 | 26.4 |
| Density | 0.9238 | 0.920 | 0.928 | 0.921 | 0.923 |
| Ti, ppm | 5-6 | 3-5 | 2-4 | 3-5 | 2-4 |
| % ash | 0.042 | 0.037 | 0.030 | 0.036 | 0.023 |
| Granular Properties | | | | | |
| Bulk density | 20.9 | 25.6 | 19.7 | 26.2 | 21.2 |
| Average particle Size, in. | 0.0324 | 0.0488 | 0.0493 | 0.0463 | 0.0538 |

[1]TEAL is triethyl aluminum
TIBAL is tri-isobutyl aluminum
THNEXAL is tri-n-hexyl aluminum
TNOCTAL is tri-n-octyl aluminum The examples of Table II demonstrate that copolymers having high bulk density, low catalyst residues, and attractive polymer properties can be prepared with the catalysts of the present invention which catalysts are prepared with two different activator compounds.

What is claimed is:

1. A continuous catalytic process for producing ethylene copolymer with a Ti containing catalyst at a productivity of $\geq 50,000$ pounds of polymer per pound of Ti in a fluid bed reactor under a pressure of $<1000$ psi in the gas phase said polymer being produced in granular form and having a density of $\geq 0.91$ to $\leq 0.94$ and a melt flow ratio of $\geq 22$ to $\leq 32$ which comprises polymerizing ethylene with at least one $C_3$ to $C_8$ alpha olefin at a temperature of about 30° to 105° C. by contacting the monomer charge with, in the presence of about 0 to 2.0 mols of hydrogen per mol of ethylene in the gas phase reaction zone, particles of a catalyst composition comprising a precursor composition of the formula $$Mg_mTi_1(OR)_nX_p[ED]_q$$

wherein R is a $C_1$ to $C_{14}$ aliphatic or aromatic hydrocarbon radical, or COR' wherein R' is a $C_1$ to $C_{14}$ aliphatic or aromatic hydrocarbon radical, X is selected from the group consisting of Cl, Br, I or mixtures thereof, ED is an electron donor compound, m is $\geq 0.5$ to $\leq 56$, n is 0, 1 or 2, p is $\geq 2$ to $\leq 116$, and q is $\geq 2$ to $\leq 85$, said precursor composition being impregnated in a porous support and being first partially activated outside of said reactor in a hydrogen slurry with $>0$ to $\leq 10$ mols of activator compound per mol of Ti in said precursor composition, and then completely activated in said reactor with $>10$ to $\leq 400$ mols of activator compound per mol of Ti in said precursor composition in the absence of a solvent so as to avoid the need for drying the fully active catalyst to remove solvent therefrom, said activator compound having the formula $$Al(R'')_cX'_dH_e$$

wherein X' is Cl or OR''', R'' and R''' are the same or different, and are $C_1$ to $C_{14}$ saturated hydrocarbon radicals, d is 0 to 1.5, e is 1 or 0 and $c+d+e=3$, said electron donor compound being a liquid organic compound in which said precursor composition is soluble and which is selected from the group consisting of alkyl esters of aliphatic and aromatic carboxylic acids, aliphatic esters, cyclic ethers and aliphatic ketones.

2. A process as in claim 1 which is conducted under a mass gas flow rate of about 1.5 to 10 times Gmf.

3. A process as in claim 2 which is conducted at a productivity of $\geq 100,000$.

4. A process as in claim 3 in which said precursor composition is partially activated with about $>0$ to $\leq 10$ mols of said activator compound outside of said reactor and is completely activated in said reactor with sufficient activator compound to provide an Al/Ti ratio of about 15 to 60 in said reactor.

5. A process as in claim 1 in which ethylene is copolymerized with propylene.

6. A process as in claim 1 in which ethylene is copolymerized with butene-1.

* * * * *